United States Patent [19]

Kaneko

[11] 4,432,021
[45] Feb. 14, 1984

[54] ROTARY RECORDING MEDIUM REPRODUCING APPARATUS

[75] Inventor: Kenji Kaneko, Iwai, Japan

[73] Assignee: Victor Company of Japan Ltd.

[21] Appl. No.: 331,778

[22] Filed: Dec. 17, 1981

[30] Foreign Application Priority Data

Dec. 22, 1980 [JP] Japan ................................. 55-181576

[51] Int. Cl.³ .......................... H04N 5/76; G11B 7/00; G11B 21/10
[52] U.S. Cl. ....................................... 358/342; 369/43; 360/77
[58] Field of Search ................ 358/335, 342, 347, 907, 358/310, 314, 336, 323; 360/77; 369/111, 43, 47, 44

[56] References Cited

U.S. PATENT DOCUMENTS 4,315,283 2/1982 Kinjo et al. .......................... 358/342
4,322,836 3/1982 Kinjo et al. .......................... 369/43

Primary Examiner—Robert L. Richardson
Attorney, Agent, or Firm—Anthony H. Handal

[57] ABSTRACT

A rotary recording medium reproducing apparatus reproduces a rotary recording medium having a spiral video signal track recorded with a video signal by use of a reproducing element, where the recording medium further has a reference signal track between each information signal track turn alternately switched over and recorded with first and second reference signals for an interval corresponding to each track turn, and recorded with a third reference signal at a position corresponding to the position where the first and second reference signals are switched over. The reproducing apparatus comprises a standard signal generating circuit for generating first and second standard signals respectively having frequencies equal to the horizontal scanning frequency and the vertical scanning frequency of the recorded video signal, a waveform shaping circuit for synchronizing a reproduced third reference signal with the first standard signal from the standard signal generating circuit, and subjecting the reproduced third reference signal to waveform-shaping, a switching signal forming circuit for forming a switching signal in response to the second standard signal from the standard signal generating circuit and the signal from the waveform shaping circuit, and a circuit for obtaining a tracking control signal for controlling tracking of the reproducing element by switching reproduced first and second reference signals by the formed switching signal.

7 Claims, 6 Drawing Figures

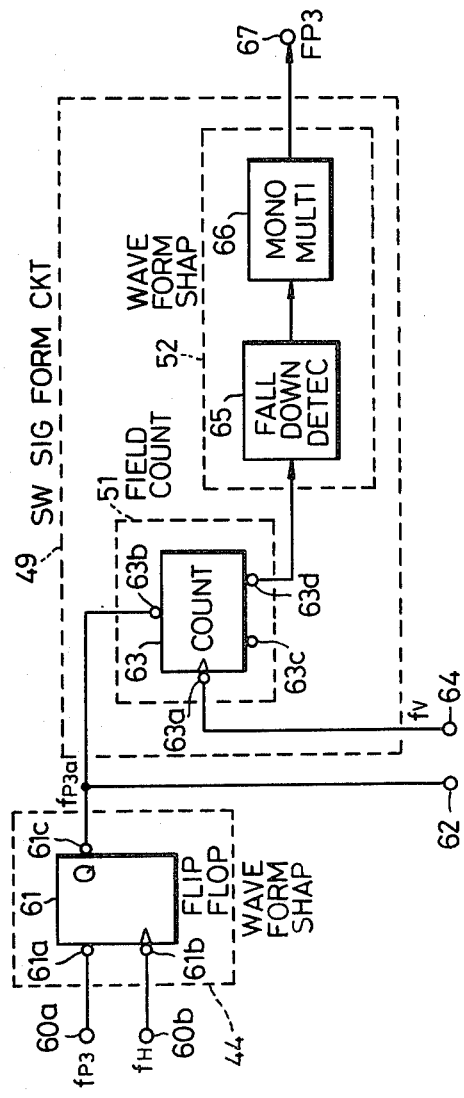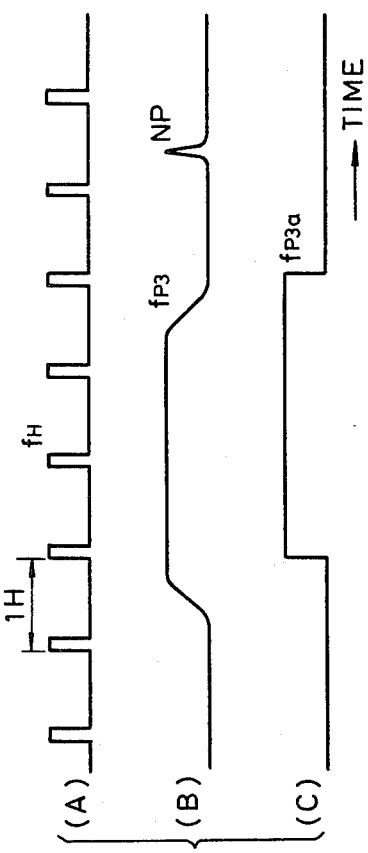

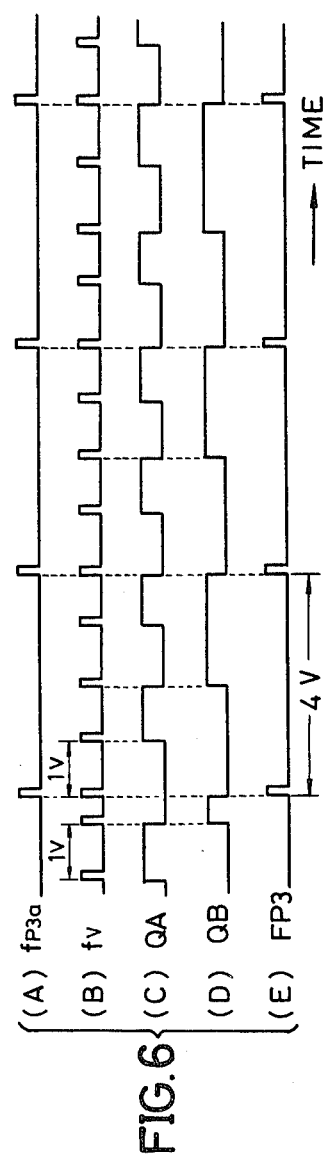

ROTARY RECORDING MEDIUM REPRODUCING APPARATUS

BACKGROUND OF THE INVENTION

The present invention generally relates to rotary recording medium reproducing apparatuses, and more particularly to a reproducing apparatus for reproducing a rotary recording medium alternately recorded with first and second reference signals for tracking control, on both sides of a track for every one track turn, and also recorded with a third reference signal for switching used upon reproduction when forming a tracking control signal, at a predetermined position in each track turn, and capable of accurately obtaining the tracking control signal upon reproduction of this rotary recording medium even when a noise component exists or dropout of the third reference signal occurs.

Systems have been realized in which a recording system forms pits in accordance with information signal being recorded along a spiral track on a flat rotary recording medium (hereinafter referred to as disc), without forming a groove therein, and a reproducing stylus traces over along this track to reproduce the recorded information signal in response to variations in the electrostatic capacitance in a reproducing system.

In this system, since no groove is provided on the disc for guiding the reproducing stylus, pilot or reference signals are recorded on or in the vicinity of a track of the information signal, such as a video signal, on the disc. Upon reproduction, the reference signals are reproduced together with the video signal. Tracking servo control is carried out so that the reproducing stylus accurately traces along the track in response to the reproduced reference signals.

In the above disc, only one of a first and second reference signals fp1 and fp2 is recorded at an intermediate position between center lines of adjacent track turns. Moreover, the side on which the first and second reference signals are recorded with respect to one track turn changes over every one track turn. That is, when the first and second reference signals are respectively recorded on the right and left sides of one track turn, the relationship between the recorded positions of the reference signals is such that the second and first reference signals are respectively recorded on the right and left sides of adjacent track turns. Furthermore, a third reference signal fp3 for obtaining a switching signal upon reproduction, is recorded for every track turn at recording switching positions of the above first and second reference signals.

In a reproducing apparatus, a changeover operation is performed by use of the third reference signal reproduced upon obtaining of a tracking control signal from the reproduced first and second reference signals.

Since no grooves are provided in the above disc, the reproducing stylus can be transferred from one track to another without damaging the reproducing stylus or the disc. Accordingly, in addition to the special reproduction such as still reproduction, slow-motion reproduction, and quick-motion reproduction, the system is capable of performing a so-called random access in which the reproducing stylus is transferred to a desired position at high speed to reproduce the desired information.

In the conventional reproducing apparatus, the third reference signal is simply subjected to waveform-shaping, to obtain the switching signal for switching positions of the above first and second reference signals. Hence, in a case where a noise component in the form of a pulse exists at a position other than the position where the normal third reference signal exists, or the normal third reference signal which should exist does not exist due to dropout and the like, the switching signal is not formed in a normal manner. Thus, there was a disadvantage in that the operation to switch over the first and second reference signals could not be performed in the above described case. In the above case, the tracking control signal cannot be obtained in a normal manner, and moreover, normal tracking control cannot be performed with respect to the reproducing stylus.

SUMMARY OF THE INVENTION

Accordingly, it is a general object of the present invention to provide a novel and useful rotary recording medium reproducing apparatus in which the above described disadvantages have been overcome.

Another and more specific object of the present invention is to provide a rotary recording medium reproducing apparatus which obtains a switching signal for switching over reproduced first and second reference signals, by use of a reproduced third reference signal and a standard signal generated by a standard signal generating circuit. According to the rotary recording medium reproducing apparatus of the present invention, even when a noise component exists at a position other than the position of the normal third reference signal, or when dropout of the normal third reference signal occurs, a normal switching signal can always be obtained without being affected by the above, and thus, a normal tracking control signal can always be obtained.

Other objects and further features of the present invention will be apparent from the following detailed description when read in conjunction with the accompanying drawings

BRIEF DESCRIPTION OF THE DRAWINGS

FIG. 4 is a concrete systematic block diagram showing a part of the block system shown in FIG. 3; and FIGS. 5(A) through 5(C), and 6(A) through 6(E), are diagrams respectively showing waveforms at each part of the block system shown in FIGS. 3 and 4.

DETAILED DESCRIPTION

First, description will be given with respect to a rotary recording medium which is reproduced by a rotary recording medium reproducing apparatus according to the present invention, by referring to FIGS. 1 and 2.

A video signal is recorded on a spiral track with pits formed on the disc 10 responsive to the information contents of the signal. Track turns of a single continuous spiral track, corresponding to each revolution of the disc 10, are designated by $t_1, t_2, t_3$—. As shown in FIG. 1, each track turn is constituted by the formation of pits 11 of the main information signal along the plane track path and has no stylus guide groove formed therein. With respect to one track turn $t_1$, in every horizontal scanning period (H) at a position corresponding to the horizontal blanking period, pits 12 of a first reference signal fp1 are formed on one lateral side of the track as viewed in the track path direction. Pits 13 of a second reference signal fp2 are formed on the other side of the track.

At an intermediate position between center lines of adjacent track turns, only pits of either one kind of the pits 12 and 13 of the above reference signals fp1 and fp2 are formed, and with respect to one track, moreover, the sides on which the pits 12 and 13 are formed are changed over for every track turn. That is, if pits 12 and 13 are respectively formed on the right and left sides of one track turn, for example, pits 13 and 12 are respectively formed on the right and left sides of each of the adjacent track turns.

Figure 2:
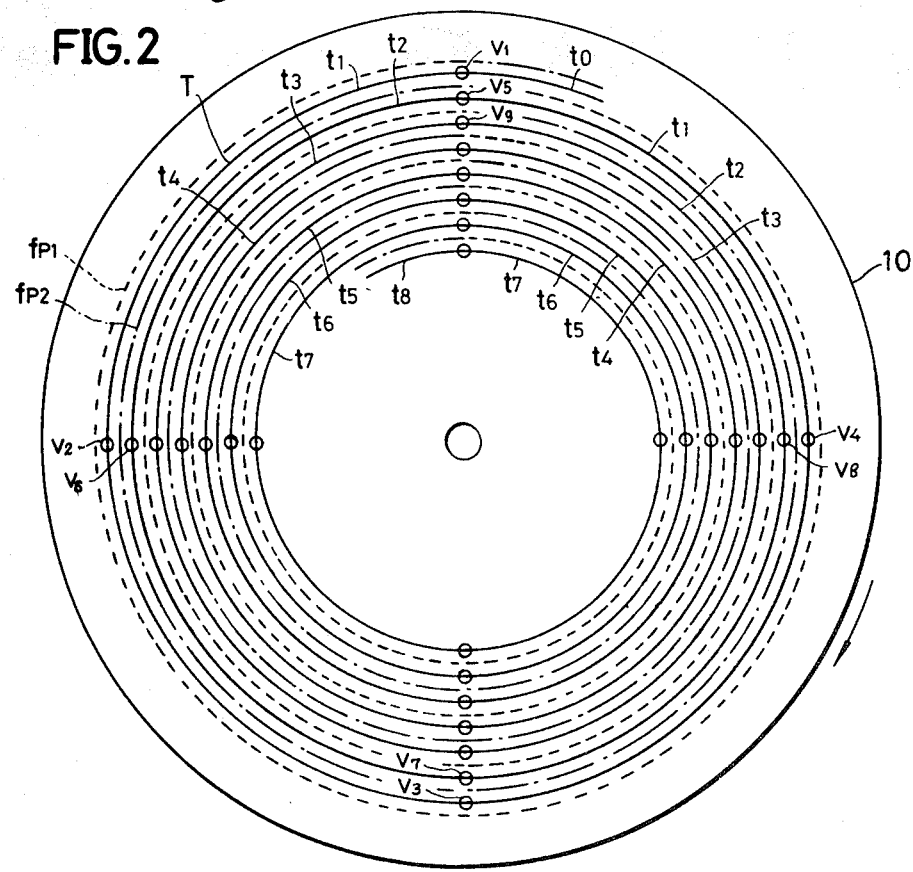
FIG. 2 is a diagram for explaining the recorded state of reference signals on a track pattern on a rotary recording medium.

As indicated in FIG. 2, a video signal is recorded along a spiral track T of the disc 10 for two frames, that is, four fields, per one revolution of the disc. In FIG. 2, the tracks of the reference signal fp1 is shown by dotted lines while the tracks of the reference signal fp2 is shown by one-dot chain lines. The positions of the vertical synchronizing signals of respective fields are designated by reference characters V1, V2, V3,—, and the successive track parts corresponding to one revolution of the disc of a single spiral track I are respectively designated by track turns $t_1$, $t_2$, $t_3$,—. Furthermore, a third reference signal fp3 is recorded at the starting end positions V1, V5, V9,—of each track turns $t_1$, $t_2$, $t_3$,—, that is, at positions where the reference signals fp1 and fp2 change over.

Figure 1:
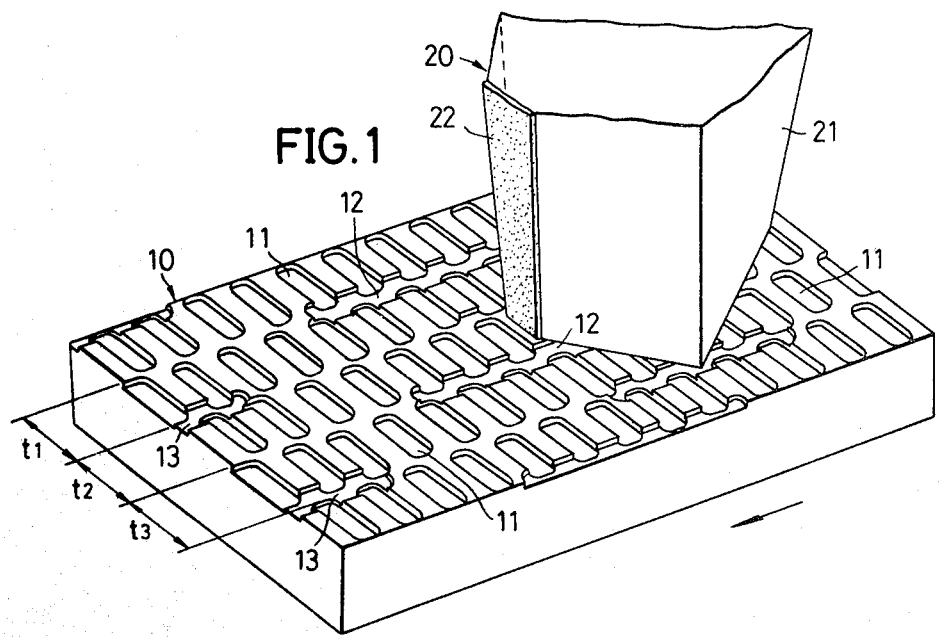
FIG. 1 is a perspective view showing a part of a rotary recording medium reproduced by a rotary recording medium according to the present invention, in an enlarged state together with a tip end part of a reproducing stylus.

The tip end of a reproducing stylus 20 has a shape shown in FIG. 1. The reproducing stylus 20 consists of a stylus structure 21 having a disc tracing surface which has a width greater than a track width, and an electrode 22 fixed to the rear face of the stylus structure 21. As the reproducing stylus 20 traces along a track on the disc 10 which is rotating in a direction indicated by an arrow, the video signal recorded thereon by the formation of pits is reproduced as variations in the electrostatic capacitance between the surface of the disc 10 and the electrode 22 of the reproducing stylus 20.

Figure 3:
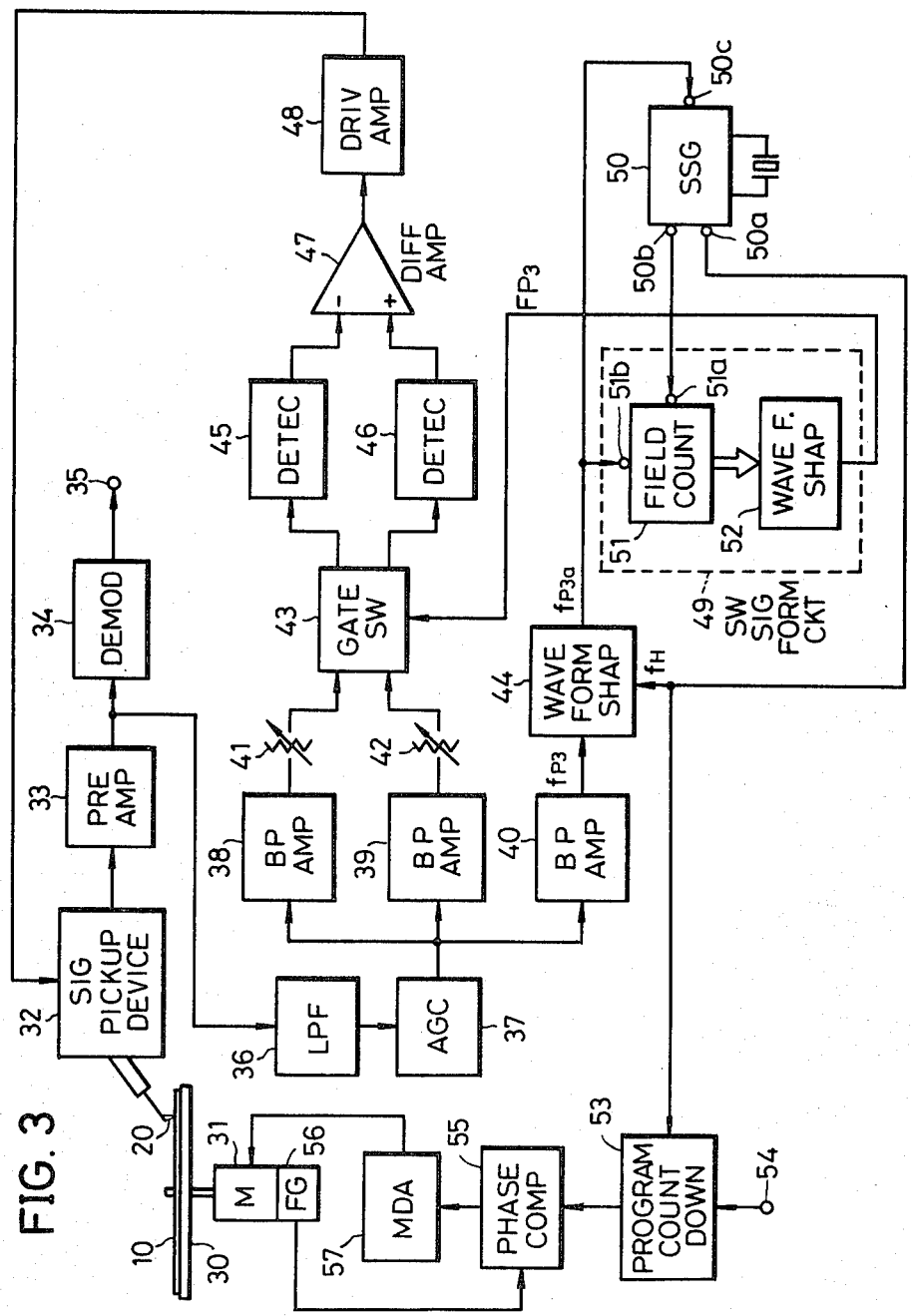
FIG. 3 is a systematic block diagram showing an embodiment of a rotary recording medium reproducng apparatus according to the present invention.

In FIG. 3, the disc 10 is placed onto a turntable 30, and in a case where the disc 10 is recorded with an NTSC system color video signal, the disc 10 is rotated at a rotational speed of fifteen revolutions per second, that is, 900 revolutions per minute, by a motor 31. When the signal recorded on the disc 10 is a PAL system or SECAM system color video signal, the motor 31 rotates the disc 10 at a rotational speed of 750 revolutions per minute. A reproduced signal picked up from the disc 10 as minute variations in the electrostatic capacitance by the reproducing stylus 20 of a signal pickup device 32, is supplied to a preamplifier 33 having a resonant circuit. The resonance frequency of the resonant circuit varies in response to this variation in the electrostatic capacitance, and is formed into a signal of a desired level. The resulting output of the preamplifier 33, is demodulated into the original video signal by a demodulator 34 and is obtained as an output through an output terminal 35.

The output signal of the preamplifier 33 is supplied to a lowpass filter 36 wherein the reference signals fp1, fp2, and fp3 are separated. The output reference signals pass through an automatic gain control circuit 37 and are respectively supplied to amplifiers 38, 39, and 40. Here, each of the amplifiers 38, 39, and 40 is a kind of a band-pass amplifier respectively designed to have steep passing frequency characteristics at only the respective frequency fp1, fp2 and fp3. As a result, the first and second reference signals having frequencies fp1 and fp2 are respectively separated and obtained from the amplifiers 38 and 39. These signals respectively pass through level adjustors 41 and 42, wherein the levels of the signal are adjusted. The resulting signals are then supplied to a gate switching circuit 43.

The third reference signal fp3 which is separated and amplified at the amplifier 40, is supplied to a waveform shaping circuit 44 wherein the signal is subjected to waveform-shaping as will be described hereinafter. The third reference signal fp3 thus subjected to the waveform-shaping is supplied to a switching signal forming circuit 49 and a standard signal generating circuit 50. A switching signal FP3 which is obtained from the switching signal forming circuit 49 in a manner described hereinafter, is supplied to the gate switching circuit 43.

The gate switching circuit 43 performs switching of the reference signals fp1 and fp2 every one revolution period of the disc 10 upon normal reproduction, in response to the above switching pulse applied thereto. Hence, due to the switching pulse which reverses polarity every two frames (1/15 seconds), the reference signals fp1 and fp2 are always alternately supplied to detection circuits 45 and 46 with predetermined polarities, from the gate switching circuit 43.

The detection circuits 45 and 46 detect the envelopes of their respective input reference signals, and convert the input reference signals into DC voltages. These DC voltages are then respectively supplied to a differential amplifier 47. The differential amplifier 47 compares the output signals of the two detection circuits 45 and 46 which vary in response to the reproduced levels of the reference signals fp1 and fp2, and generates an output tracking error signal which indicates the tracking error direction and the error quantity. This error signal is further amplified to a specific level by a driving amplifier 48.

An output signal of the driving amplifier 48 is applied to a coil of the signal pickup device 32 as a control signal, to control the signal pickup device 32. Accordingly, a cantilever mounted with the reproducing stylus 20 undergoes displacement whereby the reproducing stylus 20 is tracking controlled so that the above tracking error signal becomes zero, that is, so that the reproducing stylus 20 correctly traces over the track T of the disc 10.

The standard signal generating circuit 50 consists of an oscillating circuit part for stably producing a signal $f_H$ having a frequency of 15.734 kHz which is equal to the horizontal scanning frequency, and a frequency-dividing circuit part for frequency-dividing the frequency of the output signal $f_H$ of the above oscillating circuit part into a frequency of 60 Hz which is equal to the vertical scanning frequency. This frequency-dividing circuit part is reset by the signal from the waveform shaping circuit 44.

The output horizontal scanning frequency signal $f_H$ of the above oscillating circuit part obtained through an output terminal 50a of the standard signal generating circuit 50, is supplied to a programmable count down circuit 53. The frequency-dividing ratio of the programmable count down circuit 53 is changed over by a control signal applied from a terminal 54. Accordingly, the frequency-dividing ratio of the programmable count down circuit 53 is set to 1/21 when the signal recorded on the disc 10 is an NTSC system color video signal, and set to 1/25 when the signal recorded on the disc 10 is a PAL system or SECAM system color video signal.

The frequency-divided signal obtained from the programmable count down circuit 53 is supplied to a phase comparator 55, wherein the phase of the signal is compared with the phase of a rotation detection signal detected by a frequency generator 56 which is provided unitarily with the motor 31. An output error signal of the phase comparator 55 obtained as a result of the phase comparison, is supplied to a motor driving amplifier 57, to drive and control the motor 31 by an output of the motor driving amplifier 57. The frequency generator 56 generates fifty detection pulses for one revolution of the disc 10. In a case where four fields of the NTSC system color video signal is recorded for each track turn or the disc 10, there are 1050 horizontal scanning lines recorded for each track turn. Therefore, twenty-one horizontal scanning lines are reproduced for one detection pulse from the above frequency generator 56. Accordingly, in this case, the frequency-dividing ratio of the programmable count down circuit 53 is set to 1/21 as described above. On the other hand, when a PAL system or SECAM system color video signal is recorded on the disc 10, 1250 horizontal scanning lines are recorded for each track turn. Hence, twenty-five horizontal scanning lines are reproduced for one detection pulse from the frequency generator 56. Thus, in this case, the frequency-dividing ratio of the programmable count down circuit 53 is set to 1/25 as described above.

The horizontal scanning frequency signal $f_H$ indicated in FIG. 5(A) which is obtained through the terminal 50a of the standard signal generating circuit 50, is supplied to the programmable count down circuit 53 as described above, and also supplied to the waveform shaping circuit 44. The reproduced third reference signal fp3 supplied to the waveform shaping circuit 44 from the amplifier 40, has a distorted waveform as indicated in FIG. 5(B). This third reference signal fp3 is synchronized with the signal $f_H$ indicated in FIG. 5(A) and subjected to waveform-shaping at the waveform shaping circuit 44, and formed into a reference signal fp3a having a waveform indicated in FIG. 5(C) in which the signal is synchronized with the rise of the signal $f_H$. In addition, even when a noise NP in the form of a pulse is mixed into the reproduced reference signal fp3 as indicated in FIG. 5(B), it is improbable from a point of view of probability that this will become synchronized with the signal $f_H$ indicated in FIG. 5(A), since the existing interval of this type of noise NP is short. Accordingly, a signal is accordance with the above noise NP is not produced from the waveform shaping circuit 44. Therefore, by performing synchronization with respect to the signal $f_H$ at the waveform shaping circuit 44, the noise component can substantially be eliminated.

The reference signal fp3a indicated in FIGS. 5(C) and 6(A) which is subjected to waveform-shaping and obtained from the waveform shaping circuit 44, is supplied to a reset terminal 50c of the frequency-dividing circuit part within the standard signal generating circuit 50, to reset this frequency-dividing circuit part. In FIGS. 6(A) through 6(E), the scale of the time base is reduced from that in FIGS. 5(A) through 5(C). The above frequency-dividing circuit part within the standard signal generating circuit 50 frequency-divides the frequency of the output signal $f_H$ of the oscillating circuit part within the standard signal generating circuit 50. Hence, a frequency-divided signal $f_V$ having a frequency of 60 Hz obtained by frequency-dividing the above output signal $f_H$ of the oscillating circuit part, is supplied to a counting input terminal 51a of a field counter 51 within the switching signal forming circuit 40 from an output terminal 50b. Here, since the frequency-dividing part within the standard signal generating circuit 50 is reset by the reference signal fp3a, the signal $f_V$ obtained from the output terminal 50b is produced in synchronism with the reference signal fp3a which is obtained first after the operation is started, as indicated in FIG. 6(B). The signal $f_V$ is produced for every one field period, that is, for every vertical scanning period (1V).

The field counter 51 counts the signal $f_V$ which is supplied to the input terminal 51a, and is reset by the reference signal fp3a applied to a reset terminal 51b from the waveform shaping circuit 44. The field counter 51 produces a symmetrical rectangular wave with a four-field period (that is, 4V) indicated in FIG. 6(D), and supplied this signal to a waveform shaping circuit 52. This waveform shaping circuit 52 produces the switching signal FP3 indicated in FIG. 6(E) according to the fall in the signal indicated in FIG. 6(D). The above switching signal FP3 is supplied to the gate switching circuit 43.

Description will now be given with respect to an embodiment of a concrete block circuit system of the above waveform shaping circuit 44 and the switching signal forming circuit 49, by referring to FIG. 4.

The waveform shaping circuit 44 consists of a D-type flip-flop 61. The reference signal fp3 indicated in FIG. 5(B) which is supplied to a terminal 60a from the amplifier 40, is applied to a data terminal 61a of the flip-flop 61. Moreover, the signal $f_H$ indicated in FIG. 5(A) which is supplied to a terminal 60b from the output terminal 50a of the standard signal generating circuit 50, is applied to a terminal 61b of the flip-flop 61. Accordingly, the reference signal fp3a indicated in FIGS. 5(C) and 6(A) which is synchronized and subjected to waveform shaping, is produced through a Q-output terminal 61c of the flip-flop 61.

The above reference signal fp3a is supplied to the terminal 50c of the standard signal generating circuit 50, and also supplied to a reset terminal 63b of a two-bit counter 63 constructing the field counter 51 within the switching signal forming circuit 49. The counter 63 is reset by the signal fp3a, and output terminals 63c and 63d respectively become of low levels. The signal $f_V$ indicated in FIG. 6(B) which is obtained from the output terminal 50b of the standard signal generating circuit 50, is supplied to a counter input terminal 63a of the counter 63 through an input terminal 64. The above counter 63 counts the signal $f_V$, and produces a symmetrical rectangular wave signal QA indicated in FIG. 6(C) having a two-field period (2V period) through the output terminal 63c. Furthermore, the counter 63 produces the symmetrical rectangular wave signal QB indicated in FIG. 6(D) having the four-field period (4V period) through the output terminal 63d. Since the counter 63 is reset by the signal fp3a, the output symmetrical rectangular wave signals QA and QB are respectively in synchronism with the signal fp3a.

The output signal QB having the four-field period (4V period), that is, the period of one revolution of the disc 10, of the output signals QA and QB produced from the counter 63, is supplied to a falling down detection circuit 65 which constructs the waveform shaping circuit 52 together with a monostable multivibrator 66. The falling down in the signal QB is detected at the detection circuit 65, and a detected output of the detection circuit 65 is supplied to the monostable multivibrator 66 to trigger this monostable multivibrator 66. Hence, the switching signal FP3 indicated in FIG. 6(E) having a four-field period (4V period) is accordingly obtained from the monostable multivibrator 66. The above switching signal FP3 is applied to the gate switching circuit 43 through an output terminal 67.

According to the apparatus of the present invention, the synchronization of the reproduced reference signal fp3 by the horizontal scanning frequency signal $f_H$ is performed at the waveform shaping circuit 44. Thus, as described in conjunction with FIG. 5(B), even when the noise component NP is mixed within the reproduced reference signal fp3, this noise component NP can substantially be eliminated, and the tracking control is not affected by the above noise component NP. Hence, the switching operation of the gate switching circuit 43 by the switching signal FP3 is always performed accurately, without being erroneously performed due to the noise component. In addition, since the reset signal supplied to the standard signal generating circuit 50 is the signal fp3a which is synchronized at the waveform shaping circuit 44 as described above, the standard signal generating circuit 50 is stably reset even when some jitter is present in the reproduced signal due to instability (jitter) in the servo system of the motor 31.

Furthermore, in the case where dropout exists in the reproduced signal and the third reference signal fp3 is dropped out, the standard signal generating circuit 50 continues to operate although the output reference signal fp3a is not produced from the waveform shaping circuit 44. Thus, even in this case, the signals $f_H$ and $f_V$ are normally produced through the output terminals 50a and 50b. Therefore, even when the above dropout of the signal exists, the switching signal FP3 can be obtained from the switching signal forming circuit 49 in a normal manner.

Further, the present invention is not limited to these embodiments, but various variations and modifications may be made without departing from the scope of the present invention.

What is claimed is:

1. A rotary recording medium reproducing apparatus for reproducing a rotary recording medium having a spiral video signal track recorded with a video signal by use of a reproducing element, said recording medium further having a reference signal track between each video signal track turn alternately switched over and recorded with first and second reference signals for an interval corresponding to said each track turn, and recorded with a third reference signal at a position corresponding to the position where said first and second reference signals are switched over, said reproducing apparatus comprising:

a standard signal generating circuit for generating first and second standard signals respectively having frequencies equal to the horizontal scanning frequency and the vertical scanning frequency of said recorded video signal;

a waveform shaping circuit for synchronizing a reproduced third reference signal with the first standard signal from said standard signal generating circuit, and subjecting the reproduced third reference signal to waveform-shaping;

a switching signal forming circuit for forming a switching signal in response to the second standard signal from said standard signal generating circuit and the signal from said waveform shaping circuit; and means for obtaining a tracking control signal for controlling tracking of said reproducing element by switching reproduced first and second reference signals by said formed switching signal.

2. A reproducing apparatus as claimed in claim 1 in which said standard signal generating circuit consists of an oscillating circuit for producing said first standard signal, and a frequency-dividing circuit for frequency-dividing the frequency of said first standard signal thus produced, and said frequency-dividing circuit is reset of the frequency-dividing operation by a signal from said waveform shaping circuit.

3. A reproducing apparatus as claimed in claim 1 in which said switching signal forming circuit consists of a counter for counting the second standard signal from said standard signal generating circuit, and a switching signal obtaining circuit obtaining said switching signal by an output signal of said counter.

4. A reproducing apparatus as claimed in claim 3 in which said video signal is recorded in units of N fields (N is an integer equal to or greater than two) for each track turn, said counter produces a signal having a period of N fields, and said switching signal obtaining circuit produces the switching signal for every N fields.

5. A reproducing apparatus as claimed in claim 3 in which said counter is reset of the counting operation by a signal from said waveform shaping circuit.

6. A reproducing apparatus as claimed in claim 3 in which said switching signal obtaining circuit consists of a detection circuit for detecting a fall in the output signal of said counter, and a monostable multivibrator triggered by an output signal of said detection circuit, for producing the switching signal.

7. A reproducing apparatus as claimed in claim 1 further comprising a motor for rotating said rotary recording medium, and a servo system for controlling the rotation of said motor, wherein said servo system is supplied with said first standard signal from said standard signal generating circuit.

\* \* \* \* \*